Patented June 21, 1932

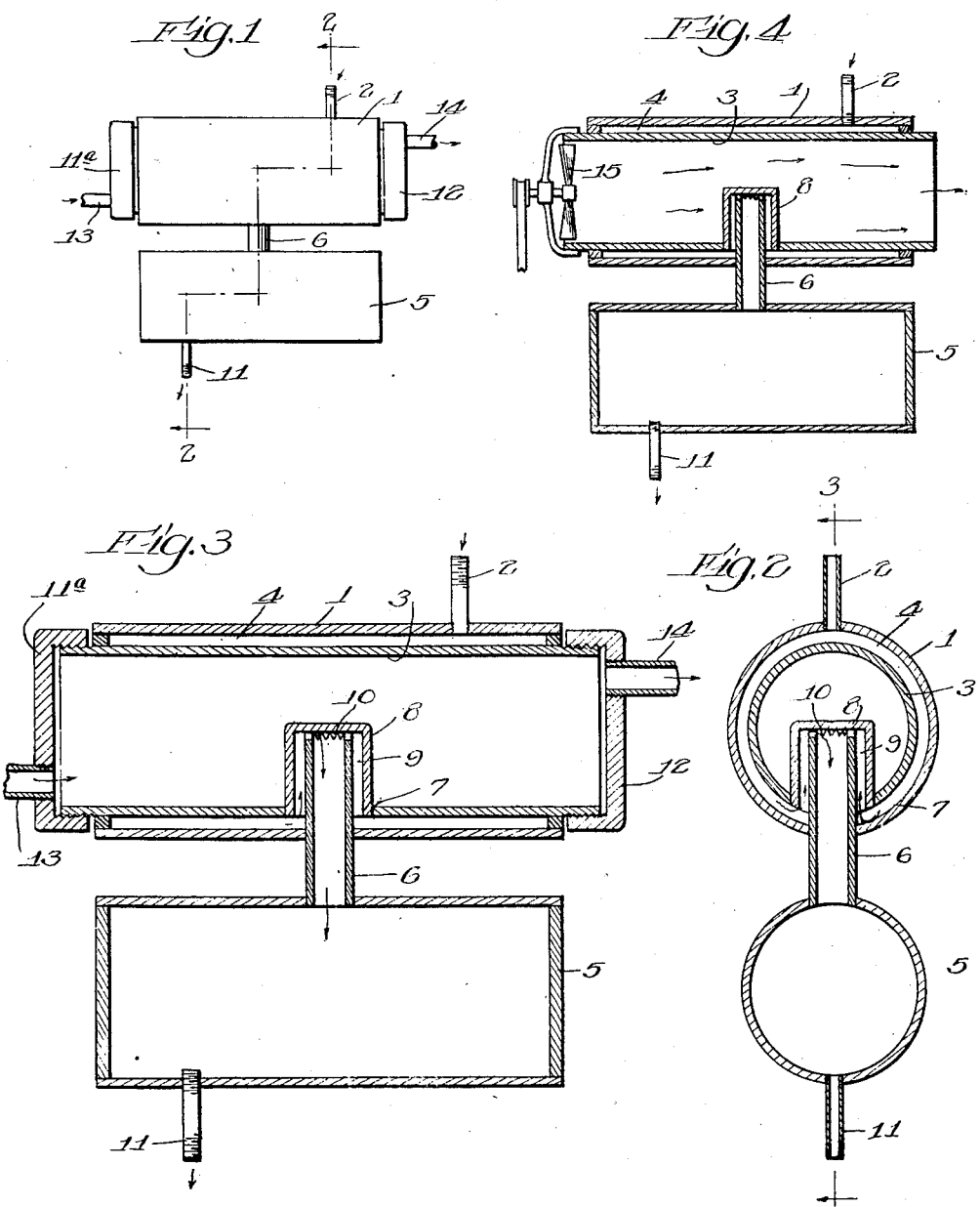

1,863,718

UNITED STATES PATENT OFFICE

HERMAN W. KLEIST, OF CHICAGO, ILLINOIS, ASSIGNOR TO DOLE REFRIGERATING MACHINE COMPANY, OF CHICAGO, ILLINOIS, A CORPORATION OF ILLINOIS

REFRIGERATING APPARATUS

Application filed November 26, 1926. Serial No. 150,703.

This invention relates to a refrigerating apparatus and has for its object to provide a new and improved device of this description. The invention has for a further object to provide a simple, cheap and effective refrigerating apparatus which can be used either in small refrigerators for house use or in large refrigerators for other uses. The invention has as a further object to provide a refrigerating apparatus by means of which the refrigerant gas can be easily and cheaply reduced to a liquid. The invention has other objects which are more particularly pointed out in the accompanying drawing.

Referring now to the drawing: Fig. 1 is a side elevation of one form of a device embodying the invention. Fig. 2 is a sectional view taken on line 2—2 of Fig. 1.

Fig. 3 is a sectional view taken on line 3—3 of Fig. 2.

Fig. 4 is a view showing a modified construction.

Like numerals refer to like parts throughout the several figures.

Referring now to the drawing, I have shown a gas receptacle 1 provided with an inlet 2 which leads from the compressor (not shown). Within the gas receptacle is a cooling receptacle 3 which contains the cooling fluid. There is a space 4 between the two receptacles into which the gas to be condensed is received. The cooling material in the cooling receptacle may be any suitable fluid, such as water or air or the like.

Associated with the gas receptacle is a refrigerant receptacle 5 for the condensed refrigerant, coming from the gas receptacle. One or more connections 6 extend from the receptacle 5 through openings in the receptacles 1 and 3 and project partway into the receptacle 3. The connection 6 fits tightly in the opening in the receptacle 1 and loosely in the receptacle 3, there being a space between this connection and the wall of the opening 7 in the receptacle 3.

An enclosing device 8 covers the end of the projection 6 which extends into the receptacle 3. The enclosing device 8 makes a tight connection with the walls of the opening 7 in the receptacle 3 and there is a space 9 between the enclosing device and the projecting end of the connection 6. The end of the connection 6 is provided with a series of openings 10 which are comparatively small and which are arranged so that the material from the space 4 may pass up through the space 9 and through the openings 10 down through the connection 6 into the receptacle 5.

A connection 11 leads from the receptacle 5 to the point where the refrigerant is used for cooling purposes. When a liquid such as water, is used in the cooling chamber 3, it is circulated through said chamber by a pump (not shown), so as to increase its cooling efficiency. When a small device is to be used, a single connection 6 will be sufficient but when larger devices are used, a plurality of these connections may be provided. It will be seen that the device may therefore be made small and if it is desired to make a large apparatus, it is only necessary to either lengthen the receptacles or increase their diameter or both.

It will be seen that the enclosing device 8 covers the end of the connection 6 and that this enclosing device and the openings 10 form a throttling device for throttling the passage of the material into the connection 6.

The fluid used in the cooling receptacle is preferably moved therethrough, so as to secure an efficient cooling effect. When a cooling fluid, such as water, is used, the cooling receptacle 3 may be provided with the end pieces 11ᵃ and 12. The water may be admitted by means of the inlet 13 connected with a suitable source of supply and discharged by means of an outlet 14. The water may come from any suitable source of supply and may be used over again by utilizing some suitable cooling means.

When the cooling fluid is air, the air may be moved through the cooling chamber by any suitable air moving device 15, located so as to move the air through the cooling device. One form of this device is illustrated in Fig. 4, where the air moving device is shown as a fan.

The use and operation of my invention are as follows: When the apparatus is in use, the gas passes from the compressor through the pipe 2 into the gas receptacle 1 and into the space 4 between the receptacles 1 and 3. The cooling fluid, such as water or air or the like, is circulated through the cooling receptacle 3 and the gas in the space 4 coming into contact with the outer wall of the receptacle 3 is thereby cooled and condensed. The enclosing device or devices 8 are also cooled and the cooled material from the space 4 is spread out about the inner wall of the cooled enclosing device 8 in a thin layer. The material in the space 9 is further cooled and then passes in liquid form through the small openings 10 where it is further cooled.

The condensate then passes through the connectoin 11 to the point of use where it is expanded in the usual way to produce the cooling effect and is then compressed by the compressor and returned to the gas receptacle 1. It will be seen that in this apparatus the gas is spread out in a thin layer in the space 4 about the cooling receptacle 3 so as to be cooled effectively and condensed and this condensate is further spread out in a thin layer along the interior wall of the device 8 in the space 9 and is then separated into small streams passing through the openings 10 along the cooled upper end of the enclosing device 8. The parts are arranged so that the gas will be sufficiently cooled to be condensed before passing through the openings 10.

I claim:

1. A refrigerating apparatus comprising a gas receptacle, a cooling receptacle surrounded by the gas receptacle and separated therefrom by a space into which the gas is received, a refrigerant receptacle, a connection between the refrigerant receptacle and the gas receptacle, said connection having an end which projects into the cooling receptacle, an enclosing device for said projecting end, separated from the projecting end by a space which communicates with the space between the gas receptacle and the cooling receptacle and a plurality of openings connecting the space between the enclosing device and the projecting end of said connection, and the interior of said connection.

2. A refrigerating apparatus comprising a gas receptacle, a cooling receptacle surrounded by the gas receptacle and separated therefrom by a space into which the gas is received, a refrigerant receptacle, a connection between the refrigerant receptacle and the gas receptacle and means associated with the said connection for dividing the material passing into said connection into separated portions.

3. A refrigerating apparatus comprising a gas receptacle, a cooling receptacle for the cooling fluid surrounded by said gas receptacle, separated therefrom by a space, said receptacles having openings in alignment, the opening in the cooling receptacle being larger than that in the gas receptacle, a discharge pipe projecting through said openings into the cooling receptacle and having a tight fit with the opening in the gas receptacle, an enclosing device which covers the end of said pipe and a plurality of connections between the portion of the pipe in the cooling receptacle and the gas space in the gas receptacle.

4. A refrigerating apparatus comprising a gas container, a cooling receptacle, an enclosing device for the material to be cooled, located in said receptacle, means for admitting a cooling fluid into said receptacle, a refrigerant receptacle, and a pipe extending from the refrigerant receptacle and projecting through the wall of the cooling receptacle into said enclosing device, and thereby forming a connection between said refrigerant receptacle and the gas container.

Signed at Chicago, county of Cook and State of Illinois, this 17th day of November, 1926.

HERMAN W. KLEIST.